US010589693B2

(12) United States Patent
Stechschulte

(10) Patent No.: US 10,589,693 B2
(45) Date of Patent: Mar. 17, 2020

(54) BICYCLE STORAGE RACK

(71) Applicant: Mark Stechschulte, Dublin, OH (US)

(72) Inventor: Mark Stechschulte, Dublin, OH (US)

( * ) Notice: Subject to any disclaimer, the term of this patent is extended or adjusted under 35 U.S.C. 154(b) by 0 days.

(21) Appl. No.: 16/037,339

(22) Filed: Jul. 17, 2018

(65) Prior Publication Data
US 2020/0023786 A1 Jan. 23, 2020

(51) Int. Cl.
*B60R 9/10* (2006.01)
*B60R 9/048* (2006.01)
*B60R 9/06* (2006.01)
*B62H 3/00* (2006.01)

(52) U.S. Cl.
CPC .............. *B60R 9/10* (2013.01); *B60R 9/048* (2013.01); *B60R 9/06* (2013.01); *B62H 3/00* (2013.01)

(58) Field of Classification Search
CPC .. B60R 9/10; B60R 9/048; B60R 9/06; B62H 3/00
USPC ........................................................ 211/182
See application file for complete search history.

(56) References Cited

U.S. PATENT DOCUMENTS

| 287,471 | A | * | 10/1883 | Raughtigan | ............. | A47L 19/04 |
| | | | | | | 220/487 |
| 1,737,971 | A | * | 12/1929 | Law | ..................... | A47B 47/027 |
| | | | | | | 211/182 |
| 1,774,096 | A | * | 8/1930 | Hasterok | .................. | G10G 5/00 |
| | | | | | | 211/182 |
| 2,110,158 | A | * | 3/1938 | Keeler | ............... | A47G 25/0678 |
| | | | | | | 211/182 |
| 2,720,414 | A | * | 10/1955 | Hart | ....................... | B62D 33/08 |
| | | | | | | 211/182 |
| 2,913,029 | A | * | 11/1959 | Paton | .................. | B65D 90/046 |
| | | | | | | 105/363 |
| 3,137,422 | A | | 6/1964 | Wheaton | | |
| 3,215,323 | A | * | 11/1965 | Bonitt | ....................... | B60R 9/06 |
| | | | | | | 224/325 |
| 3,747,965 | A | * | 7/1973 | Wing | ........................ | A47F 5/14 |
| | | | | | | 403/173 |
| 3,847,317 | A | | 11/1974 | Raff et al. | | |
| 3,863,875 | A | * | 2/1975 | Olson | .................... | A47B 13/06 |
| | | | | | | 108/158.11 |

(Continued)

FOREIGN PATENT DOCUMENTS

FR 2699874 A1 * 7/1994 ............... B60R 9/10

OTHER PUBLICATIONS

PCT/US2019/041519 International Search Report and Written Opinion dated Sep. 30, 2019, 14 pages.

*Primary Examiner* — Stanton L Krycinski
(74) *Attorney, Agent, or Firm* — Hahn Loeser & Parks LLP

(57) ABSTRACT

The invention relates to a bicycle storage rack and a method of storing a bicycle using a bicycle storage rack. The bicycle storage rack comprises a plurality of horizontal support members, a plurality of vertical support members, and one or more gripping members secured to at least one of the plurality of horizontal support members. The method of storing a bicycle using a bicycle storage rack comprises placing a bicycle into a horizontal position on a bicycle storage rack where a rotational axis of a wheel of the bicycle is divergent to each of a plurality of horizontal support members. In some examples, the bicycle storage rack is located within a bed of a truck, and the method further comprises covering the bicycle storage rack and the bicycle with a tonneau cover associated with the truck.

19 Claims, 6 Drawing Sheets

(56) References Cited

U.S. PATENT DOCUMENTS

| | | | | |
|---|---|---|---|---|
| 3,864,051 A * | 2/1975 | Reid | ................... | A47B 47/0016 |
| | | | | 211/182 |
| 4,178,844 A * | 12/1979 | Ward | ................... | A47J 37/0694 |
| | | | | 108/102 |
| 4,236,854 A * | 12/1980 | Rogers | ...................... | B60P 7/15 |
| | | | | 410/121 |
| 4,265,382 A * | 5/1981 | Edwards | ................... | B60R 9/06 |
| | | | | 224/309 |
| 4,684,087 A * | 8/1987 | Spickard | ................ | B65B 67/12 |
| | | | | 224/539 |
| 4,862,602 A * | 9/1989 | Krill | ....................... | D06F 57/00 |
| | | | | 34/239 |
| 4,946,050 A * | 8/1990 | Akopiantz | ................ | A47F 5/13 |
| | | | | 211/182 |
| 5,016,844 A * | 5/1991 | Garvin | ................... | B65B 67/12 |
| | | | | 248/150 |
| 5,067,644 A * | 11/1991 | Coleman | ................ | B60R 9/048 |
| | | | | 224/309 |
| D324,951 S * | 3/1992 | Narramore | ...................... | D6/552 |
| 5,092,504 A | 3/1992 | Hannes et al. | | |
| 5,460,274 A | 10/1995 | Kramer | | |
| 5,476,200 A | 12/1995 | Wong | | |
| 5,520,314 A * | 5/1996 | Tkachuk | ................... | B60P 7/06 |
| | | | | 224/403 |
| 5,641,106 A * | 6/1997 | Slaughter | ................... | B60R 9/06 |
| | | | | 224/324 |
| 5,743,412 A * | 4/1998 | Noble | ..................... | A47F 1/121 |
| | | | | 211/182 |
| 5,769,291 A * | 6/1998 | Chasan | ..................... | B60R 9/08 |
| | | | | 224/318 |
| 5,848,708 A | 12/1998 | Edwards | | |
| 5,904,463 A * | 5/1999 | Christensen | ............ | B60R 9/042 |
| | | | | 224/310 |
| 5,934,725 A | 8/1999 | Bowers | | |
| 5,984,111 A | 11/1999 | Pennella | | |
| 6,027,000 A * | 2/2000 | Sterzel | ...................... | B60R 7/02 |
| | | | | 211/182 |
| 6,164,607 A * | 12/2000 | Hawkes | ................... | B65B 67/12 |
| | | | | 248/97 |
| 6,234,372 B1 | 5/2001 | Rivera | | |
| 6,394,326 B1 | 5/2002 | Lanier | | |
| 6,491,331 B1 | 12/2002 | Fox | | |
| 6,536,640 B1 * | 3/2003 | Gent | ......................... | B60R 9/00 |
| | | | | 224/403 |
| 6,997,332 B1 * | 2/2006 | Alexander | ........... | A47B 47/027 |
| | | | | 211/182 |
| 7,066,432 B2 * | 6/2006 | Wood | ................... | B65B 67/1205 |
| | | | | 248/150 |
| 7,604,143 B2 * | 10/2009 | Kerekes, Jr. | .......... | B65F 1/1415 |
| | | | | 141/114 |
| 7,850,021 B2 * | 12/2010 | Yang | ................... | A47B 47/0008 |
| | | | | 211/182 |
| 8,528,748 B2 * | 9/2013 | Shaha | ...................... | B62H 3/12 |
| | | | | 211/17 |
| 8,931,648 B1 | 1/2015 | Tam | | |
| 2006/0065687 A1 | 3/2006 | Reed | | |
| 2008/0216345 A1* | 9/2008 | Barkfelt | ................... | F26B 9/066 |
| | | | | 34/235 |
| 2009/0302077 A1 | 12/2009 | Yee et al. | | |
| 2016/0001825 A1 | 1/2016 | Manlick et al. | | |
| 2016/0016519 A1 | 1/2016 | Rempe | | |
| 2017/0349111 A1 | 12/2017 | Ramsdell et al. | | |

* cited by examiner

BICYCLE STORAGE RACK

BACKGROUND

Examples described herein relate generally to structures and methods. More particularly, this invention is directed to a bicycle storage rack and a method of storing a bicycle.

DESCRIPTION OF THE RELATED ART

A cyclist may not always have easy access to trails or other routes on which it is ideal or safe to ride his or her bicycle. In order to access an ideal route, a cyclist may be forced to choose between riding his or her bicycle to the start of the route, which could cause fatigue before the workout even begins, or transporting the bicycle to the route in a larger vehicle such as an automobile. However, due to the configuration of the frame, wheels, handlebars, and pedals, transporting a bicycle within a vehicle is not an easy task. The bicycle typically rests in a vertical position with the tires of the bicycle resting upon the floor of the vehicle in a manner similar to which a cyclist may ride the bicycle or in a haphazard configuration which may cause the frame, wheels, derailleurs, brakes, or pedals to become bent or damaged over time. Further complications arise if the bicycle is unable to fit inside of the vehicle and must be transported outside of the vehicle, such as in the bed of a pickup truck, which exposes the bike to the elements, such as rain, before the cyclist arrives at the destination to begin his or her workout in addition to risking the possibility of theft if the cyclist leaves the truck unattended. Still further difficulties arise in attempting to store bicycles in the bed of a truck that utilizes a tonneau cover. Accordingly, there is a need for an improved bicycle storage rack to better protect the bicycle from damage during transport while simultaneously allowing a user to store the bicycle with greater ease and security during transport.

SUMMARY

Particular examples of the invention comprise a bicycle storage rack. Certain examples of the bicycle storage rack comprise a plurality of horizontal support members, where the plurality of horizontal support members define a perimeter of the bicycle storage rack.

The bicycle storage rack further comprises a plurality of vertical support members, where a first end of each of the plurality of vertical support members contacts one or more of the plurality of horizontal support members. Each of the plurality of vertical support members is at least partially divergent to each of the plurality of horizontal support members.

The bicycle storage rack further comprises one or more gripping members secured to at least one of the plurality of horizontal support members.

Certain examples of the bicycle storage rack comprise a plurality of horizontal support members, the plurality of horizontal support members defining a perimeter of the bicycle storage rack. The plurality of horizontal support members comprise a first pair of horizontal support members comprising a first horizontal support member and a second horizontal support member and a second pair of horizontal members comprising a third horizontal support member and a fourth horizontal support member. The first horizontal support member is parallel to the second horizontal support member, and the third horizontal support member is parallel to the fourth horizontal support member. A first end of the first horizontal support member intersects a first end of the third horizontal support member at a first vertex, a second end of the first horizontal support member intersects a first end of the fourth horizontal support member at a second vertex, a second end of the second horizontal support member intersects a second end of the fourth horizontal support member at a third vertex, and a first end of the second horizontal support member intersects a second end of the third horizontal support member at a fourth vertex.

The bicycle storage rack further comprises a plurality of vertical support members, where each of the plurality of vertical support members is at least partially divergent to each of the plurality of horizontal support members. A first vertical support member of the plurality of vertical support members intersects the first vertex, a second vertical support member of the plurality of vertical support members intersects the second vertex, a third vertical support member of the plurality of vertical support members intersects the third vertex, and a fourth vertical support member of the plurality of vertical support members intersects the fourth vertex.

The bicycle storage rack further comprises one or more gripping members secured to at least one of the plurality of horizontal support members, where each of the one or more gripping members is comprised of a non-abrasive rubber material. The bicycle storage rack is free of any components within the perimeter of the bicycle storage rack.

Particular examples of the invention comprise a method of storing a bicycle. Certain examples of the method comprise placing a bicycle into a horizontal position on a bicycle storage rack. The bicycle storage rack comprises a plurality of horizontal support members, where the plurality of horizontal support members define a perimeter of the bicycle storage rack. The bicycle storage rack further comprises a plurality of vertical support members, where a first end of each of the plurality of vertical support members contacts one or more of the plurality of horizontal support members. Each of the plurality of vertical support members is at least partially divergent to each of the plurality of horizontal support members. The bicycle storage rack further comprises one or more gripping members secured to at least one of the plurality of horizontal support members. When placing the bicycle on the bicycle storage rack, a rotational axis of a wheel of the bicycle is divergent to each of the plurality of horizontal support members.

The foregoing and other examples, objects, features, and advantages of the invention will be apparent from the following more detailed descriptions of particular examples of the invention, as illustrated in the accompanying drawings wherein like reference numbers represent like parts of the examples.

DETAILED DESCRIPTION

Figure 1:
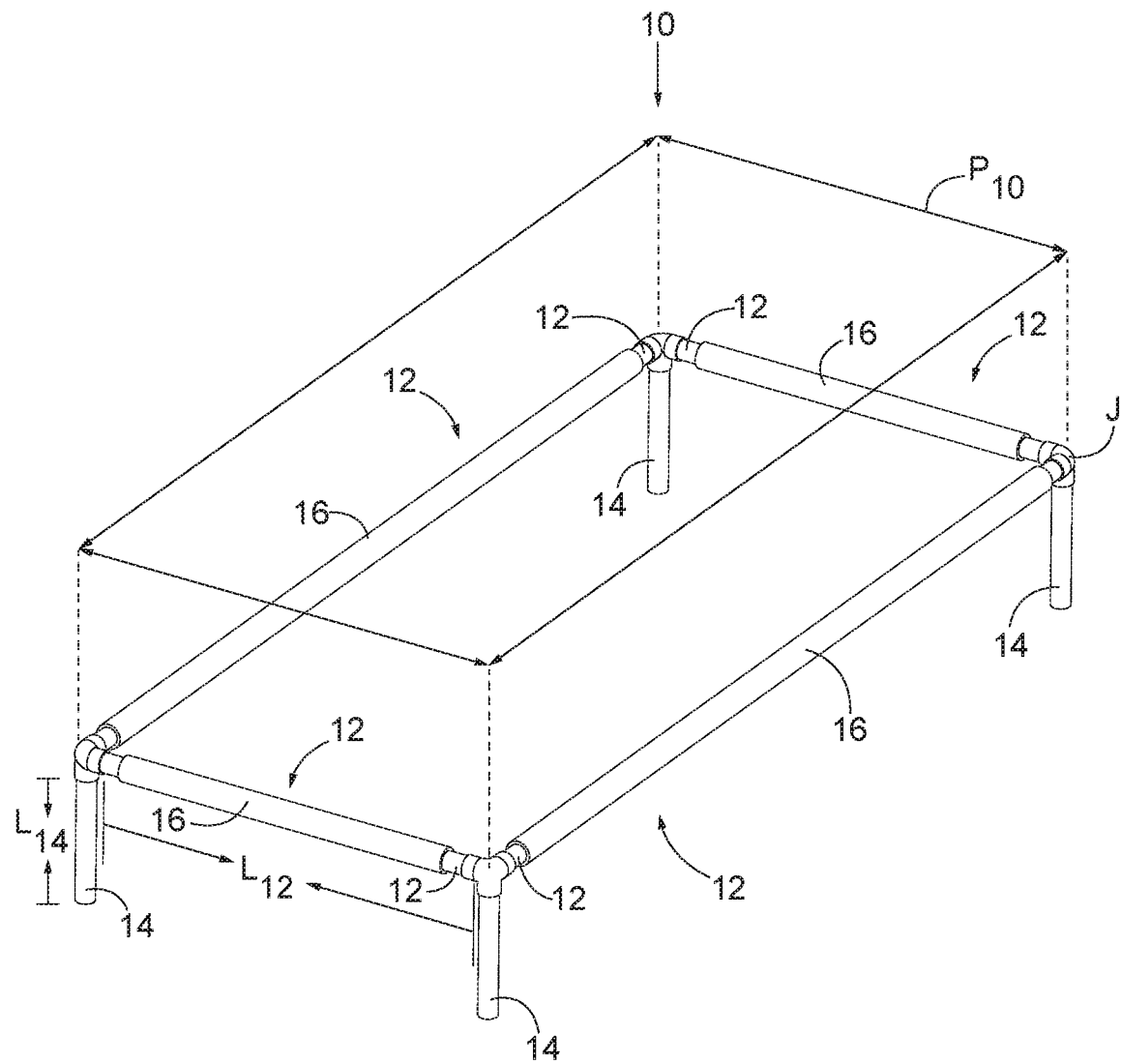
FIG. 1 is a perspective view of a bicycle storage rack, in accordance with an example.

As illustrated in the figures, examples of the invention comprise a bicycle storage rack 10. As illustrated in FIGS. 1-5, the bicycle storage rack 10 comprises a plurality of horizontal support members 12. The plurality of horizontal support members 12 define a perimeter $P_{10}$ of the bicycle storage rack 10. In some examples, the bicycle storage rack 10 is free of any components within the perimeter $P_{10}$ of the bicycle storage rack 10. As used herein, "perimeter" means "the continuous line forming the boundary of a closed geometric figure." The plurality of horizontal support members 12 may be made of a variety of materials having sufficient strength to support the weight of a bicycle. In some examples, the plurality of horizontal support members 12 are comprised of carbon fiber, metal, or a polymeric material such as polyvinyl chloride ("PVC"). In some examples, each of the plurality of horizontal support members 12 is comprised of the same material, but, in other examples, one or more of the plurality of horizontal support members 12 may be comprised of a different material than another of the plurality of horizontal support members 12. Additionally or alternatively, in some examples, the plurality of horizontal support members 12 are tubular, but, in other examples, the plurality of horizontal support members are prismatic. Each of the plurality of horizontal support members may be the same shape or a different shape than any of the other horizontal support members of the plurality of horizontal support members. The bicycle storage rack 10 further comprises a plurality of vertical support members 14. A first end $FE_{14}$ of each of the plurality of vertical support members 14 contacts one or more of the plurality of horizontal support members 12. Each of the plurality of vertical support members 14 is at least partially divergent to each of the plurality of horizontal support members 12. As used herein, "divergent" means "not parallel" meaning that each of the plurality of vertical support members 14 is at least partially not parallel to each of the plurality of horizontal support members 12. Similar to the horizontal support members 12, in some examples, the plurality of vertical support members 14 are comprised of carbon fiber, metal, or a polymeric material such as PVC. In some examples, each of the plurality of vertical support members 14 is comprised of the same material, but, in other examples, one or more of the plurality of vertical support members 14 may be comprised of a different material than another of the plurality of vertical support members 14. Additionally, in some examples, the plurality of horizontal support members 12 are comprised of the same material as the plurality of vertical support members 14, but, in other examples, the plurality of horizontal support members 12 are comprised of a different material than the plurality of vertical support members 14. In some examples, the plurality of vertical support members 14 are tubular, but, in other examples, the plurality of vertical support members are prismatic. Each of the plurality of vertical support members may be the same shape or a different shape than any of the other vertical support members of the plurality of vertical support members. In some examples, one or more of the vertical support members 14 may include a stabilizing structure comprised of non-abrasive material, such as rubber, foam, or a spray-on material. The stabilizing structure is located at an end of the vertical support member 14 such that the stabilizing structure contacts a bed of a pickup truck when the bicycle storage rack is placed within the bed. The non-abrasive material of the stabilizing structure minimizes movement of the bicycle storage rack within the bed of the pickup truck while simultaneously protecting the bed of the pickup truck from damage associated with contact with the bicycle storage rack. In some examples, the stabilizing structure may be a rubber end cap, which is either releasably secured or permanently attached to the vertical support member 14. The bicycle storage rack 10 further comprises one or more gripping members 16 secured to at least one of the plurality of horizontal support members 12. The one or more gripping members 16 are configured to resist the movement of an associated bicycle that is resting on the bicycle rack 10 during transportation. In some examples, only one gripping member 16 may be secured to each horizontal support member 12. In other examples, more than one gripping member 16 may be secured to the same horizontal support member 12. Additionally, in some examples, only one of the plurality of horizontal support members 12 may have a gripping member 16 secured thereto. In other examples, more than one of the plurality of horizontal support members 12 may have a gripping member 16 secured thereto such that two or more of the plurality of horizontal support members 12 or, in some examples, each of the horizontal support members 12, may have a gripping member 16 secured thereto.

Figure 3:
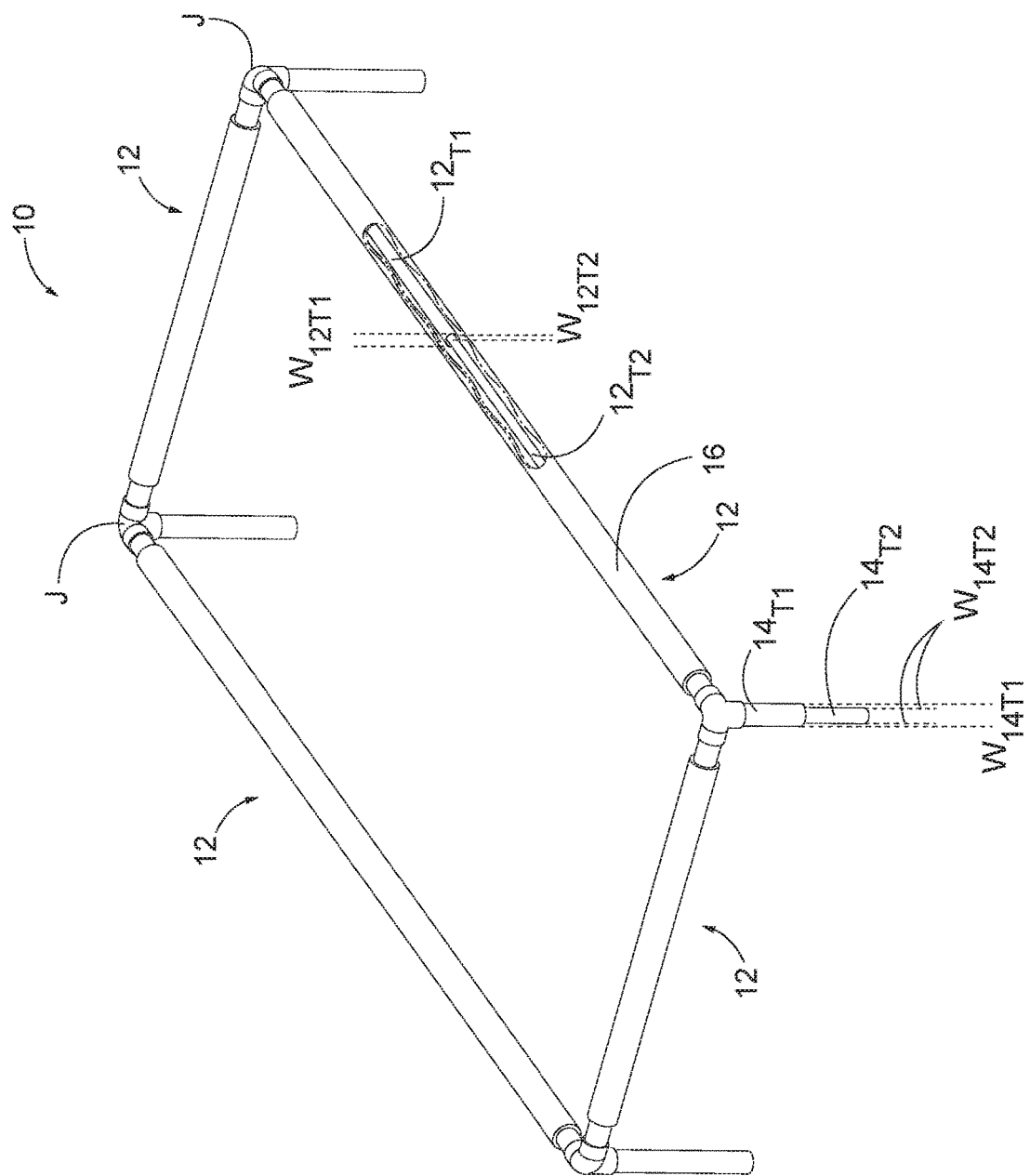
FIG. 3 is a perspective view of a bicycle storage rack, in accordance with an example.

As shown in FIG. 1, each of the plurality of horizontal support members 12 of the bicycle storage rack 10 has a length $L_{12}$, which is measured from a first outer most lengthwise extent of horizontal support member 12 to a second outer most lengthwise extent opposite the first outer most lengthwise extent of horizontal support member 12. Either of the outer most lengthwise extents of horizontal support member 12 may extend into elbow joint J in examples in which the components of bicycle storage rack 10 are not fixedly joined. In some examples, as shown in FIG. 1, each of the plurality of horizontal support members 12 has a fixed length $L_{12}$ such that the length $L_{12}$ is not variable. However, in some examples, as shown in FIG. 3, at least one of the plurality of horizontal support members 12 of the bicycle storage rack 10 comprises two or more horizontal support telescoping pieces $12_{T1}$, $12_{T2}$, which allows the bicycle storage rack 10 to accommodate bicycles of varying sizes (e.g., children's or adults' bicycles) and types (e.g., mountain bicycle, triathlon bicycle, etc.) so that the bicycle storage rack 10 contacts the bicycle in the appropriate locations discussed herein. A width of at least one of the two or more horizontal support telescoping pieces $12_{T1}$, $12_{T2}$ is smaller than a width of at least one other of the two or more horizontal support telescoping pieces $12_{T1}$, $12_{T2}$. As shown in FIG. 3, the width $W_{12T2}$ of the horizontal support telescoping piece $12_{T2}$ is smaller than the width $W_{12T1}$ of the other horizontal support telescoping piece $12_{T1}$. In this way, the horizontal support telescoping piece $12_{T2}$ telescopes into the horizontal support telescoping piece $12_{T1}$, which results in the horizontal support member 12 having a variable length $L_{12}$. In some examples, whether the length $L_{12}$ is fixed or variable, the length $L_{12}$ of the horizontal support members 12 is not greater than five (5) feet and, preferably, between four (4) and five (5) feet. Additionally or alternatively, whether the length $L_{12}$ is fixed or variable, the length $L_{12}$ of the horizontal support members 12 is greater than five (5) feet but less than seven (7) feet. Additionally or alternatively, whether the length $L_{12}$ is fixed or variable, the length $L_{12}$ of the horizontal support members 12 is greater than three (3) feet but less than five (5) feet. Additionally or alternatively, whether the length is fixed or variable, the length $L_{12}$ of the horizontal support members 12 is greater than two (2) feet but less than three (3) feet. In some examples, the length $L_{12}$ of each of the horizontal support members 12 is the same, but, in other examples, the length $L_{12}$ of each of the horizontal support members 12 is different. Additionally or alternatively, the length $L_{12}$ of horizontal support members that are parallel to each other 12 is the same. For example, in some embodiments in which the bicycle storage rack 10 is located within a bed of a pickup truck, the length $L_n$ of the horizontal support members 12 extending along a length of the bed of the pickup truck is greater than the length $L_{12}$ of the horizontal support members extending along a width of the bed of the pickup truck.

Figure 4:
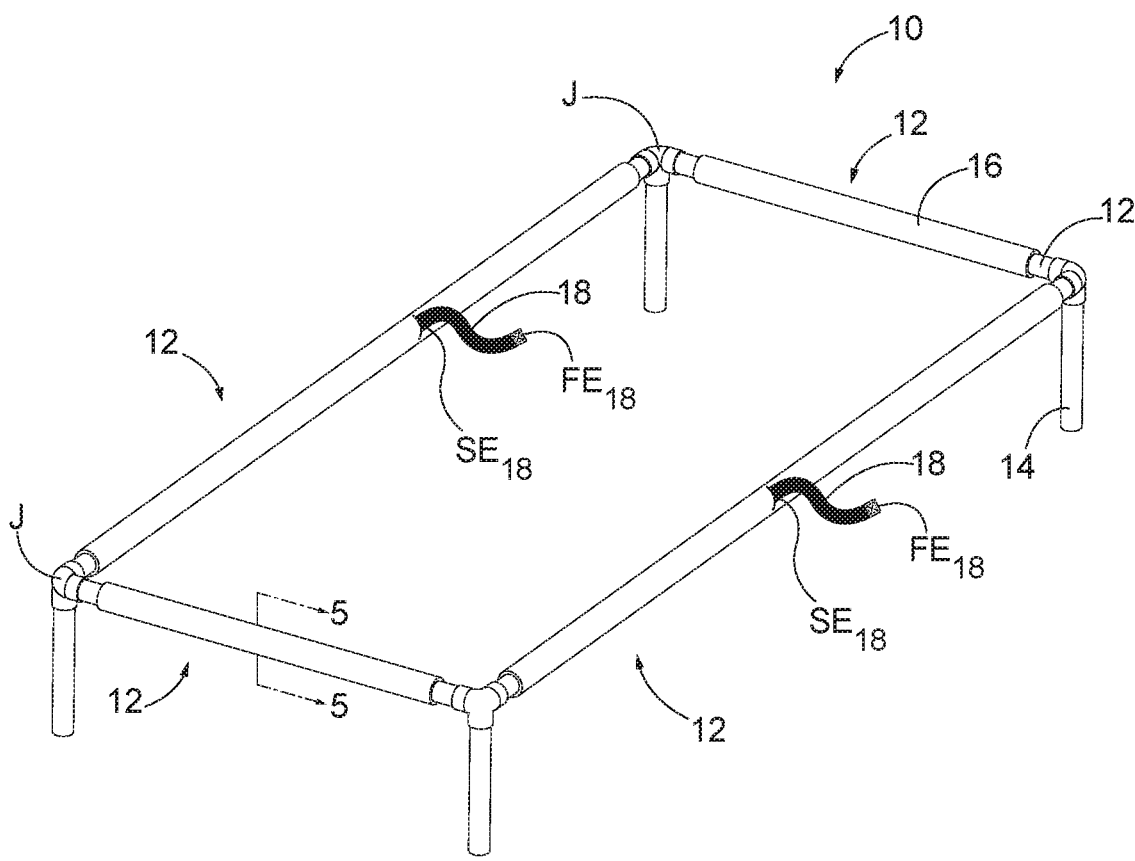
FIG. 4 is a perspective view of a bicycle storage rack, in accordance with an example.

In some examples, as shown in FIG. 4, the bicycle storage rack 10 further comprises one or more securing members 18. Each of the one or more securing members 18 has a first end $FE_{18}$ and a second end $SE_{18}$. The second end $SE_{18}$ of the securing member 18 is releasably secured to the first end $F_{E18}$ of the of the securing member 18. In some examples, the second end $SE_{18}$ is releasably secured to the first end $FE_{18}$ through use of a buckle with male and female ends. In other examples, the second end $SE_{18}$ is releasably secured to the first end $FE_m$ through use of an adhesive material, a hook and loop material, a clasp, a clamp, or other structure suitable for releasable security. In cooperation with the one or more gripping members 16, or in some versions without the assistance of the gripping members 16, the securing members 18 help to further secure a bicycle on top of the bicycle storage rack 10 by securing one or more of the frame, wheel(s), pedal(s), and/or handlebar(s) of the bicycle, which helps to better maintain the position of the bicycle on the bicycle storage rack when travelling over uneven terrain or at variable speeds. In some examples, at least one of the one or more securing members 18 is integral with at least one of the plurality of horizontal support members 12. Additionally or alternatively, at least one of the one or more securing members 18 is releasably secured to at least one of the plurality of horizontal support members 12 such that at least one of the one or more securing members 18 is not permanently attached to the at least one of the plurality of horizontal support members 12. As used herein, and shown in FIG. 4, "integral to" means "belonging as a part of the whole" meaning that the one or more securing members 18 belong to the at least one of the plurality of horizontal support members 12 as a part of the at least one of the plurality of horizontal support members 12 (i.e., permanently attached to the at least one of the plurality of horizontal support members 12).

Figure 2:
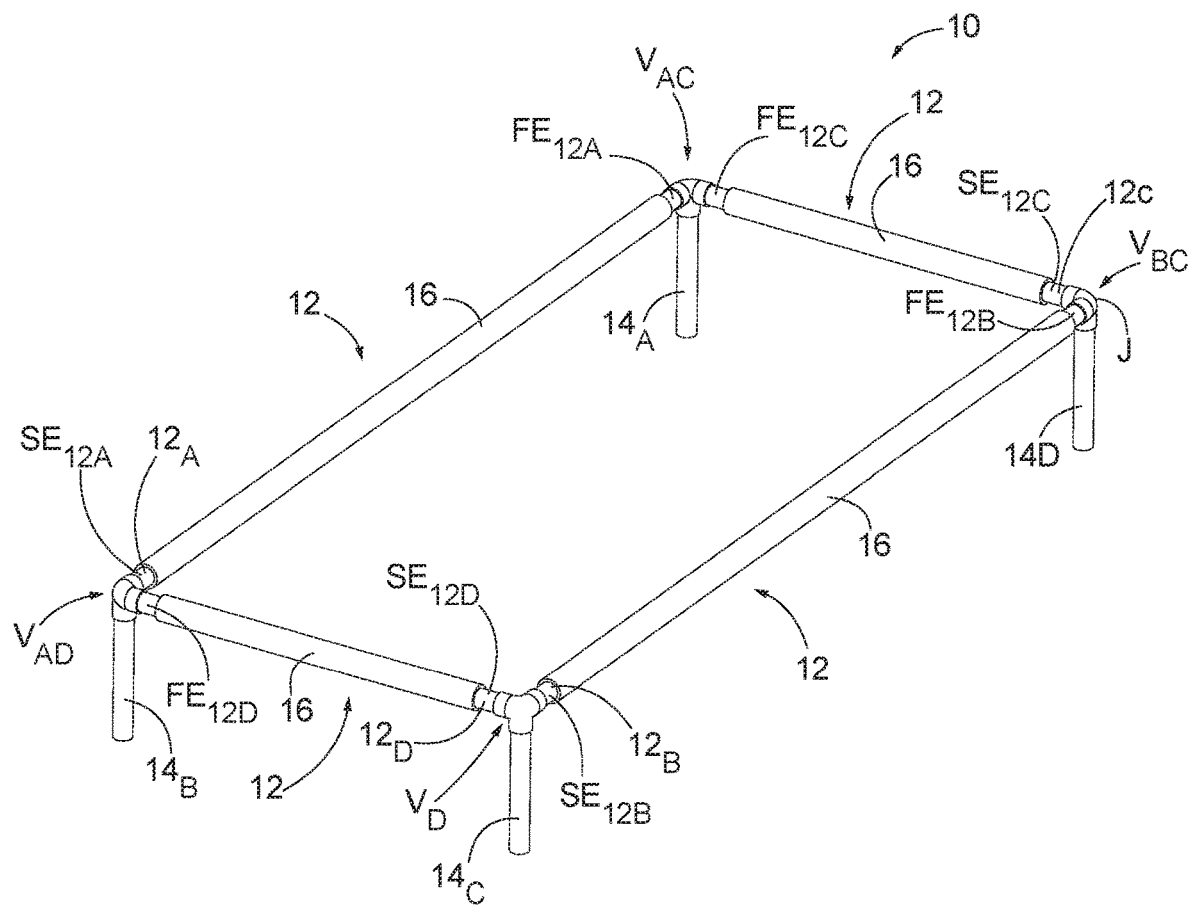
FIG. 2 is a perspective view of a bicycle storage rack, in accordance with an example.

In some examples, as shown in FIG. 2, the plurality of horizontal support members 12 comprises a first pair of horizontal support members 12 comprising a first horizontal support member $12_A$ and a second horizontal support member $12_B$. The plurality of horizontal support members 12 further comprises a second pair of horizontal support members 12 comprising a third horizontal support member $12_C$ and a fourth horizontal support member $12_D$. The first horizontal support member $12_A$ is parallel to the second horizontal support member $12_B$, and the third horizontal support member $12_C$ is parallel to the fourth horizontal support member $12_D$. In other examples, none of the first horizontal support member, second horizontal support member, third horizontal support member, and fourth horizontal support member are parallel to any of the other horizontal support members of the plurality of horizontal support members. In some examples, a first end $FE_{12A}$ of the first horizontal support member $12_A$ intersects a first end $FE_{12C}$ of the third horizontal support member $12_C$ at a first vertex $V_{AC}$, a second end $SE_{12A}$ of the first horizontal support member $12_A$ intersects a first end $FE_{12D}$ of the fourth horizontal support member $12_D$ at a second vertex $V_{AD}$, a second end $SE_{12B}$ of the second horizontal support member $12_B$ intersects a second end $SE_{12D}$ of the fourth horizontal support member $12_D$ at a third vertex $V_{BD}$, and a first end $FE_{12B}$ of the second horizontal support member $12_B$ intersects a second end $SE_{12C}$ of the third horizontal support member $12_C$ at a fourth vertex $V_{BC}$. Additionally or alternatively, the horizontal support members 12 may be joined with a separate junction component (such as an elbow joint J), or the horizontal support members may be fixedly-joined to each other without the use of a separate component in a pre-assembled manner. In examples in which the horizontal support members 12 are joined with an elbow joint J, the elbow joint J provides additional supporting strength to the bicycle storage rack 10 and, in particular, the horizontal support members 12. The elbow joint J may be comprised of carbon fiber, metal, or a polymeric material such as PVC. With the inclusion of the elbow joint J, the bicycle storage rack 10 may be disassembled when not in use, which reduces the space needed to store the bicycle storage rack 10, by removing the horizontal support members 12 and vertical support members 14 from the elbow joint J and then re-assembled when needed. In examples in which the horizontal support members are fixedly-joined to each other and to the vertical support members in a pre-assembled manner, the horizontal support members and vertical support members may be pre-assembled with the use of glue, melting, extrusion, adhesive, or another material appropriate for such permanent attachment.

Figure 5:
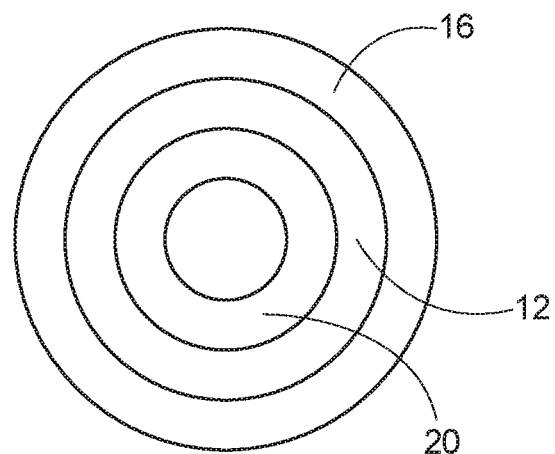
FIG. 5 is a view taken along line 5-5 in FIG. 4, in accordance with an example.

In some examples, as shown in FIG. 5, at least one of the plurality of horizontal support members 12 may comprise an internal reinforcement member 20 within the horizontal support member 12. The internal reinforcement member may be comprised of a variety of materials having sufficient strength to support the weight of a bicycle. In some examples, the internal reinforcement member 20 is comprised of carbon fiber, metal, or a polymeric material such as PVC. In some examples, as shown in FIG. 5, the internal reinforcement member 20 is tubular, but, in other examples, the internal reinforcement member may be prismatic. The internal reinforcement member may be either permanently located within the horizontal support member or releasably secured within the horizontal support member.

As shown in FIG. 1, each of the plurality of vertical support members 14 of the bicycle storage rack 10 has a length $L_{14}$, which is measured from a bottom most point of vertical support member 14 to a top most point of vertical support member 14. The top most point of vertical support member 14 may extend into elbow joint J in examples in which the components of bicycle storage rack 10 are not fixedly joined. In some examples, as shown in FIG. 1, each of the plurality of vertical support members 14 has a fixed length $L_{14}$ such that the length $L_{14}$ is not variable. However, in some examples, as shown in FIG. 3, at least one of the plurality of vertical support members 14 of the bicycle storage rack 10 comprises two or more vertical support telescoping pieces $14_{T1}$, $14_{T2}$, which allows the bicycle storage rack 10 to accommodate bicycles with handlebars, cranks, and/or pedals of varying sizes (e.g., children's or adults' bicycles) and types (e.g., mountain bicycle, triathlon bicycle, etc.) so that the bicycle storage rack 10 contacts the bicycle in the appropriate locations discussed herein and so that the bicycle storage rack 10 may properly store a bicycle without damage. In this embodiment, a width of at least one of the two or more vertical support telescoping pieces $14_{T1}$, $14_{T2}$ is smaller than a width of at least one other of the two or more vertical support telescoping pieces $14_{T1}$, $14_{T2}$. As shown in FIG. 3, the width $W_{14T2}$ of the vertical support telescoping piece $14_{T2}$ is smaller than the width $W_{14T1}$ of the other vertical support telescoping piece $14_{T1}$. In this way, the vertical support telescoping piece $14_{T2}$ telescopes into the vertical support telescoping piece $12_{T2}$, which results in the vertical support member 14 having a variable length $L_{14}$. In some examples, whether the length $L_{14}$ is fixed or variable, the length $L_{14}$ of the vertical support members 14 is not greater than ten (10) inches and, preferably, between six (6) and ten (10) inches. In other examples, whether the length $L_{14}$ is fixed or variable, the length $L_{14}$ of the vertical support members 14 is greater than ten (10) inches but less than twelve (12) inches. In further examples, whether the length $L_{14}$ is fixed or variable, the length $L_{14}$ of the vertical support members 14 is greater than four (4) inches but less than six (6) inches.

As shown in FIG. 1, in some examples, each of the vertical support members 14 of the plurality of vertical support members 14 is parallel to all other vertical support members 14 of the plurality of vertical support members 14. However, in other examples, none of the vertical support members 14 are parallel to any other vertical support members 14 of the plurality of vertical support members 14. In still further examples, at least one of the vertical support members 14 of the plurality of vertical support members 14 is parallel to at least one other vertical support member 14 of the plurality of vertical support members 14.

In some examples, as shown in FIG. 2, a first vertical support member $14_A$ of the plurality of vertical support members 14 intersects one or more of the plurality of horizontal support members at a first vertex $V_{AC}$ comprised of elbow joint J, a second vertical support member $14_B$ of the plurality of vertical support members 14 intersects one or more of the plurality of horizontal support members at a second vertex $V_{AD}$ comprised of elbow joint J, a third vertical support member $14_C$ of the plurality of vertical support members 14 intersects one or more of the plurality of horizontal support members at a third vertex $V_{BD}$ comprised of elbow joint J, and a fourth vertical support member $14_D$ of the plurality of vertical support members 14 intersects one or more of the plurality of horizontal support members at a fourth vertex $V_{BC}$ comprised of elbow joint J. Additionally or alternatively, one or more vertical support members may intersect one or more of the plurality of horizontal support members at a location other than at a vertex.

As shown in FIG. 1, one or more gripping members 16 are secured to at least one of the plurality of horizontal support members 12. In some examples, each of the one or more gripping members is comprised of a non-abrasive rubber material. In other examples, each of the one or more gripping members is comprised of a non-abrasive material, such as foam, that provides an increased degree of friction when storing a bicycle upon the bicycle storage rack while simultaneously not damaging a portion of the bicycle. Additionally or alternatively, each of the one or more gripping members is comprised of a non-abrasive spray-on material capable of providing an increased degree of friction when storing a bicycle upon the bicycle storage rack. Additionally or alternatively, the gripping members 16 are located on an upper surface of the horizontal supporting member 12. In some examples, as shown in FIG. 1, the gripping members 16 surround the outer surface area of the horizontal supporting member 12.

Figure 6:
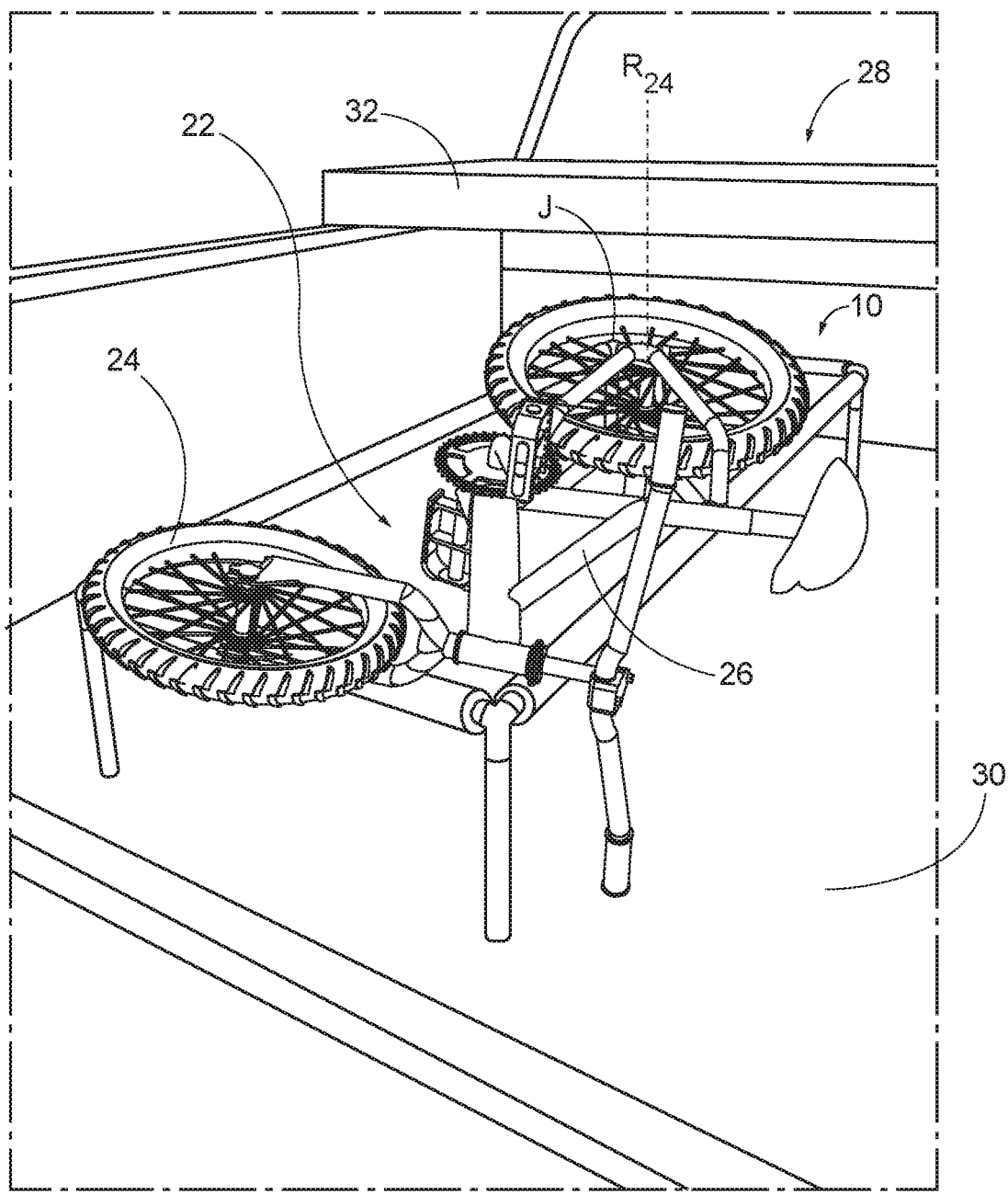
FIG. 6 is a perspective view of a bicycle storage rack in the bed of a pickup truck, in accordance with an example.
Figure 7:
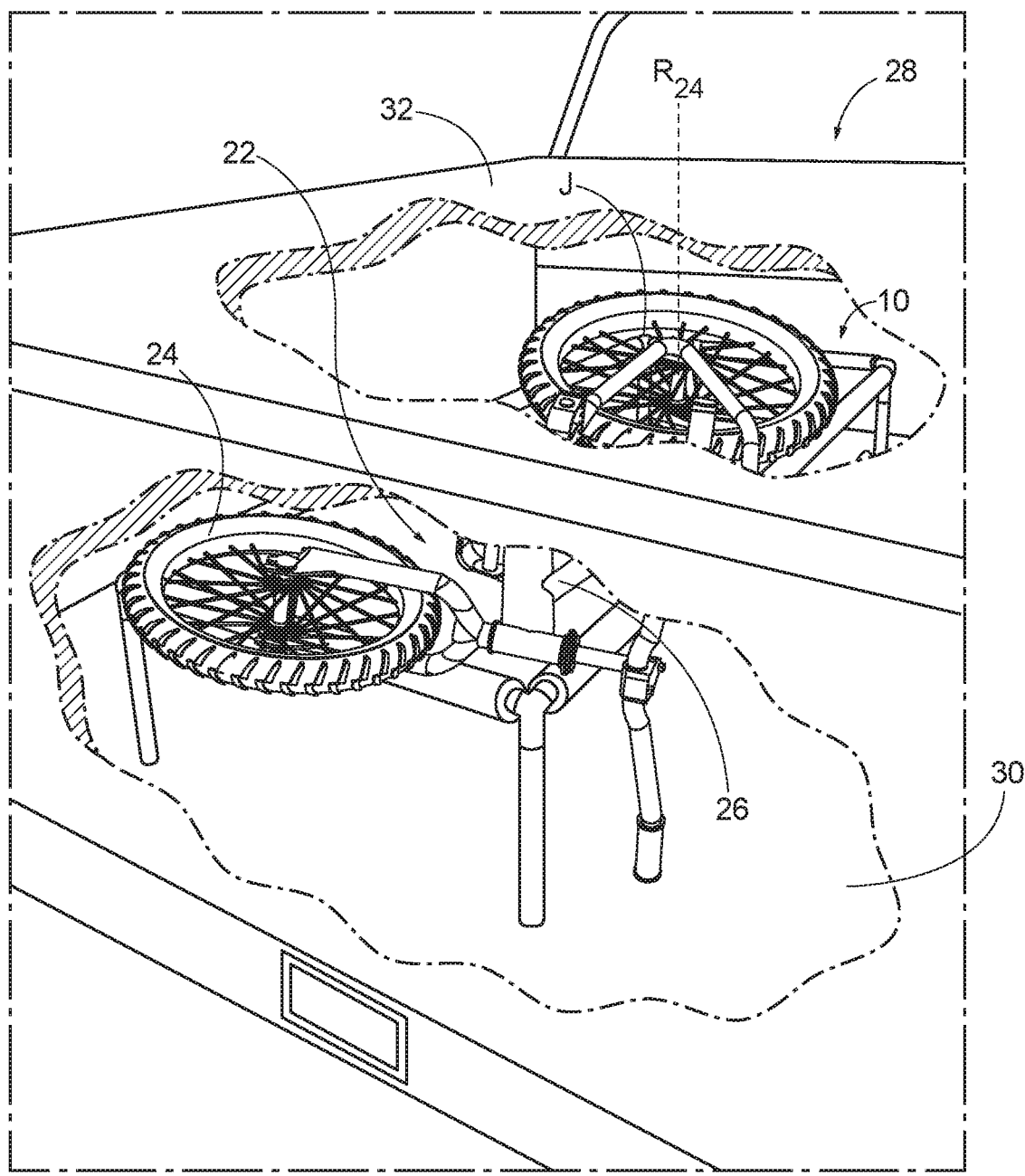
FIG. 7 is a perspective view of a bicycle storage rack in the bed of a pickup truck, in accordance with an example.

As illustrated in the figures, examples of the invention comprise a method of storing a bicycle. In some examples, as shown in FIGS. 6 and 7, the method of storing a bicycle comprises placing a bicycle 22 into a horizontal position on a bicycle storage rack 10 such as is described and disclosed herein. An example of such a bicycle storage rack 10 has been previously described herein and disclosed in FIGS. 1-5. As illustrated in FIG. 6, the bicycle 22 is placed on the bicycle storage rack 10 in such a manner such that a rotational axis $R_{24}$ of a wheel 24 of the bicycle 22 is divergent to each of the plurality of horizontal support members 12 of the bicycle storage rack 10.

In some examples, the bicycle storage rack 10 is located within the interior of a vehicle, such as in the trunk of a vehicle or in the area behind the front seat of the vehicle (such as in the cargo hold of an SUV whose seats are stored so as to provide a relatively flat cargo storage area). In other examples, as shown in FIGS. 6 and 7, the bicycle storage rack 10 is located within a bed 30 of a truck 28. In such examples, as shown in FIG. 7, the method comprises covering the bicycle storage rack 10 and the bicycle 22 placed thereon with a tonneau cover 32 of the truck 28. In this way, the bicycle 22 on the bicycle storage rack 10 is able to fit within the bed 30 of the truck 28 while also fitting underneath the tonneau cover 32 of the truck 28 such that the bicycle 22 is not exposed to the elements outside of the bed 30 of the truck 28.

In some examples, as illustrated in FIGS. 6 and 7, at least one wheel 24 of the bicycle 22 and a portion of a frame 26 of the bicycle 22 are placed upon at least one of the horizontal support members 12 in the method of storing the bicycle 22. Additionally, both wheels 24 of the bicycle 22 may be placed upon one or more of the horizontal support members 12 in the method of storing the bicycle 22. In the step of placing the bicycle 22 on the bicycle storage rack 10, the handlebars and pedals of the bicycle 22 are able to be configured in a way such that neither the handlebars nor the pedals of the bicycle 22 contact the bed 30 of the truck 28 or the tonneau cover 32 of the truck 28 or otherwise prevent the tonneau cover 32 from closing in its usual fashion. In some examples, at least one of the pedals of the bicycle 22 is located within a perimeter of the bicycle storage rack 10 and at least one of the handlebars of the bicycle 22 is located outside of the perimeter of the bicycle storage rack 10. Additionally or alternatively, two or more portions of the frame 26 of the bicycle 22 are placed upon one or more of the horizontal support members 12 in the method of storing the bicycle 22.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition, or step being referred to is an optional (i.e., not required) feature of the embodiments.

While this invention has been described with reference to embodiments thereof, it shall be understood that such description is by way of illustration only and should not be construed as limiting the scope of the claimed embodiments.

Accordingly, the scope and content of the embodiments are to be defined only by the terms of the following claims. Furthermore, it is understood that the features of any embodiment discussed herein may be combined with one or more features of any one or more embodiments otherwise discussed or contemplated herein unless otherwise stated.

The invention claimed is:

1. A bicycle storage rack comprising:
    a plurality of horizontal support members, where the plurality of horizontal support members defines a perimeter of the bicycle storage rack, and where at least one wheel of a bicycle and a portion of a frame of the bicycle are in contact with at least one of the plurality of horizontal support members;
    a plurality of vertical support members, where a first end of each of the plurality of vertical support members contacts one or more of the plurality of horizontal support members, further where each of the plurality of vertical support members is at least partially divergent to each of the plurality of horizontal support members; and
    one or more gripping members secured to at least one of the plurality of horizontal support members, where each of the one or more gripping members extend along a substantial length of at least one of the plurality of horizontal support members such that an entirety of the bicycle is supported horizontally by the one or more gripping members.

2. The bicycle storage rack of claim 1, where at least one of the plurality of horizontal support members comprises two or more horizontal support telescoping pieces, where a width of at least one of the two or more horizontal support telescoping pieces is smaller than a width of at least one other of the two or more horizontal support telescoping pieces.

3. The bicycle storage rack of claim 1, where at least one of the plurality of vertical support members comprises two or more vertical support telescoping pieces, where a width of at least one of the two or more vertical support telescoping pieces is smaller than a width of at least one other of the two or more vertical support telescoping pieces.

4. The bicycle storage rack of claim 2, where at least one of the plurality of vertical support members comprises two or more vertical support telescoping pieces, where a width of at least one of the two or more vertical support telescoping pieces is smaller than a width of at least one other of the two or more vertical support telescoping pieces.

5. The bicycle storage rack of claim 1, where each of the plurality of horizontal support members has a fixed length.

6. The bicycle storage rack of claim 1, where each of the plurality of vertical support members has a fixed length.

7. The bicycle storage rack of claim 5, where each of the plurality of vertical support members has a fixed length.

8. The bicycle storage rack of claim 1, further comprising one or more securing members, each of the one or more securing members having a first end and a second end, where the second end is releasably secured to the first end.

9. The bicycle storage rack of claim 8, where at least one of the one or more securing members is integral with at least one of the plurality of horizontal support members.

10. The bicycle storage rack of claim 8, where at least one of the one or more securing members is releasably secured to at least one of the plurality of horizontal support members.

11. The bicycle storage rack of claim 1, where each of the one or more gripping members is comprised of a non-abrasive rubber material.

12. The bicycle storage rack of claim 1, where at least one of the plurality of horizontal support members further comprises an internal reinforcement member within the at least one of the plurality of horizontal support members.

13. The bicycle storage rack of claim 1, where the bicycle storage rack is free of any components within the perimeter of the bicycle storage rack.

14. The bicycle storage rack of claim 1, where the plurality of horizontal support members comprises a first pair of horizontal support members comprising a first horizontal support member and a second horizontal support member and a second pair of horizontal members comprising a third horizontal support member and a fourth horizontal support member, where the first horizontal support member is parallel to the second horizontal support member and the third horizontal support member is parallel to the fourth horizontal support member.

15. The bicycle storage rack of claim 14, where each of the vertical support members of the plurality of vertical support members is generally parallel to all other vertical support members of the plurality of vertical support members.

16. A method of storing a bicycle, the method comprising:
    placing a bicycle into a horizontal position on a bicycle storage rack, the bicycle storage rack comprising:
        a plurality of horizontal support members, where the plurality of horizontal support members define a perimeter of the bicycle storage rack, and where at least one wheel of the bicycle and a portion of a frame of the bicycle are in contact with at least one of the plurality of horizontal support members;
        a plurality of vertical support members, where a first end of each of the plurality of vertical support members contacts one or more of the plurality of horizontal support members, further where each of the plurality of vertical support members is not parallel to each of the plurality of horizontal support members; and
        one or more gripping members secured to at least one of the plurality of horizontal support members, where each of the one or more gripping members extend along a substantial length of at least one of the plurality of horizontal support members such that an entirety of the bicycle is supported horizontally by the one or more gripping members,
    where a rotational axis of the at least one wheel of the bicycle is divergent to each of the plurality of horizontal support members.

17. The method of storing a bicycle of claim 16, the bicycle storage rack further comprising one or more securing members, each of the one or more securing members having a first end and a second end, where the second end is releasably secured to the first end.

18. The method of storing a bicycle of claim 16, where the bicycle storage rack is located within a bed of a truck, the method further comprising covering the bicycle storage rack and the bicycle with a tonneau cover associated with the truck.

19. A bicycle storage rack comprising:
    a plurality of horizontal support members, the plurality of horizontal support members defining a perimeter of the bicycle storage rack and comprising a first pair of horizontal support members comprising a first horizontal support member and a second horizontal support member and a second pair of horizontal members comprising a third horizontal support member and a fourth horizontal support member, where the first horizontal support member is parallel to the second horizontal support member and the third horizontal support member is parallel to the fourth horizontal support member, further where a first end of the first horizontal support member intersects a first end of the third horizontal support member at a first vertex, a second end of the first horizontal support member intersects a first end of the fourth horizontal support member at a second vertex, a second end of the second horizontal support member intersects a second end of the fourth horizontal support member at a third vertex, and a first end of the second horizontal support member intersects a second end of the third horizontal support member at a fourth vertex, where at least one of the plurality of horizontal support members further comprises an internal reinforcement member within the at least one of the plurality of horizontal support members;

a plurality of vertical support members, where each of the plurality of vertical support members is at least partially divergent to each of the plurality of horizontal support members, further where a first vertical support member of the plurality of vertical support members intersects the first vertex, a second vertical support member of the plurality of vertical support members intersects the second vertex, a third vertical support member of the plurality of vertical support members intersects the third vertex, and a fourth vertical support member of the plurality of vertical support members intersects the fourth vertex; and one or more gripping members secured to at least one of the plurality of horizontal support members, where each of the one or more gripping members is comprised of a non-abrasive rubber material, and where the bicycle storage rack is free of any components within the perimeter of the bicycle storage rack.

\* \* \* \* \*